United States Patent
Muramatsu

(10) Patent No.: US 8,722,281 B2
(45) Date of Patent: May 13, 2014

(54) FUEL CELL, FUEL CELL MODULE, AND FUEL CELL DEVICE

(75) Inventor: Hiroki Muramatsu, Kirishima (JP)

(73) Assignee: Kyocera Corporation, Kyoto (JP)

( * ) Notice: Subject to any disclaimer, the term of this patent is extended or adjusted under 35 U.S.C. 154(b) by 428 days.

(21) Appl. No.: 13/126,735

(22) PCT Filed: Sep. 30, 2009

(86) PCT No.: PCT/JP2009/067029
§ 371 (c)(1), (2), (4) Date: May 26, 2011

(87) PCT Pub. No.: WO2010/050330
PCT Pub. Date: May 6, 2010

(65) Prior Publication Data
US 2011/0256464 A1    Oct. 20, 2011

(30) Foreign Application Priority Data

| Oct. 29, 2008 | (JP) | ................................. 2008-278111 |
| Mar. 26, 2009 | (JP) | ................................. 2009-075739 |

(51) Int. Cl.
| H01M 8/02 | (2006.01) |
| H01M 8/12 | (2006.01) |
| H01M 4/86 | (2006.01) |
| H01M 4/90 | (2006.01) |
| H01M 8/24 | (2006.01) |

(52) U.S. Cl.
CPC .......... *H01M 8/0282* (2013.01); *H01M 8/0236* (2013.01); *H01M 8/1286* (2013.01); *H01M 8/124* (2013.01); *H01M 4/8621* (2013.01); *H01M 4/9025* (2013.01); *H01M 8/2475* (2013.01)

USPC .......................... 429/509; 429/481; 429/466

(58) Field of Classification Search
USPC .......... 429/452, 465, 466, 479–482, 507–509
See application file for complete search history.

(56) References Cited

U.S. PATENT DOCUMENTS 6,051,330 A * 4/2000 Fasano et al. .................. 429/486

FOREIGN PATENT DOCUMENTS

| JP | 2001-236972 | 8/2001 | |
| JP | 2004-234969 | 8/2004 | |
| JP | 2004234969 A * | 8/2004 | .............. H01M 8/02 |

(Continued)

OTHER PUBLICATIONS

Machine translation for Azuma, JP 2006-127826 A.*

(Continued)

*Primary Examiner* — Edu E Enin-Okut
(74) *Attorney, Agent, or Firm* — DLA Piper LLP (US)

(57) ABSTRACT

There are provided a fuel cell capable of suppressing damage to an end thereof, and a fuel cell module and a fuel cell device that include the fuel cell. In a fuel cell (1) wherein a fuel electrode layer (3) is formed on one of opposite main surfaces of a solid electrolyte layer (4) and an air electrode layer (5) is formed on the other of the main surfaces, and electric power is generated by utilizing a fuel gas and an oxygen-containing gas, an oxidation suppression layer (10) is located closer to the fuel electrode layer (3) than at least the solid electrolyte layer (4) on one end of the fuel cell (1), the oxidation suppression layer (10) being composed mainly of silicate containing at least one of elements belonging to Group 2 on the periodic table. This makes it possible to provide a fuel cell (1a) capable of suppressing damage to and oxidation of one end thereof.

6 Claims, 7 Drawing Sheets

(56) References Cited

FOREIGN PATENT DOCUMENTS

| JP | 2004-259604 | | | 9/2004 | | |
|----|----|----|----|----|----|----|
| JP | 2005-135877 | | | 5/2005 | | |
| JP | 2006-127826 | | | 5/2006 | | |
| JP | 2006127826 | A | * | 5/2006 | .............. | H01M 8/02 |
| JP | 2008192347 | A | * | 8/2008 | .............. | H01M 8/24 |

OTHER PUBLICATIONS

Machine translation for Hamada et al., JP 2004-239969 A.*
Machine translation for Nakamura, JP 2008-192347 A.*
Chinese language office action dated Jul. 11, 2013 and its English language concise explanation issued in corresponding Chinese application 200980142917.2.

* cited by examiner

FUEL CELL, FUEL CELL MODULE, AND FUEL CELL DEVICE

CROSS-REFERENCE TO THE RELATED APPLICATIONS

The present application is a national stage of international application No. PCT/JP2009/067029, filed on Sep. 30, 2009, and claims the benefit of priority under 35 USC 119 to Japanese Patent Application No. 2008-278111, filed on Oct. 29, 2008 and Japanese Patent Application No. 2009-075739, filed on Mar. 26, 2011, the entire contents of all of which are incorporated herein by reference.

TECHNICAL FIELD

The present invention relates to a fuel cell, a fuel cell module constructed by locating fuel cells in a housing, a fuel cell device equipped with the fuel cell module, and a method of manufacturing the fuel cell.

BACKGROUND ART

In recent years, as next-generation energy, various types of fuel cell modules and fuel cell devices have been proposed to date. The fuel cell module is constructed by locating, in a housing, a cell stack device constructed by securing a cell stack, which is composed of a plurality of fuel cells capable of generating electric power by utilizing a hydrogen-containing gas (fuel gas) and air (oxygen-containing gas) that are juxtaposed so as to be electrically connected in series with each other, to a manifold for effecting gas supply to the fuel cells. The fuel cell device is constructed by locating the fuel cell module in an exterior case.

In the fuel cell module and fuel cell device of this type, generation of electric power can be accomplished by feeding a fuel gas to the fuel electrode layer side of the fuel cell and feeding an oxygen-containing gas (air, in general) to the air electrode layer side thereof.

In a fuel cell having an air electrode layer formed in the interior thereof, there is the possibility of backflow of a fuel gas flowing the outside of the fuel cell that will eventually lead to damage to the fuel cell (air electrode layer). In view of this, technologies for covering an air electrode layer with a dense member made of ceramics such as zirconia and alumina are proposed for the purpose of preventing damage to the air electrode layer (refer to Patent Literature 1, for example).

Moreover, in a fuel cell constituted so that an excess of fuel gas left unused after power generation is burned at one end of the fuel cell, there is proposed a fuel cell in which a porous conductive support substrate situated around a gas discharge port is impregnated with an inorganic component composed mainly of zirconia for the purpose of protecting the front end of the fuel cell from damage caused by heat of combustion (refer to Patent Literature 2, for example).

CITATION LIST

Patent Literature

Patent Literature 1: Japanese Unexamined Patent Publication JP-A 2001-236972
Patent Literature 2: Japanese Unexamined Patent Publication JP-A 2004-259604

SUMMARY OF INVENTION

Technical Problem

However, in the case of covering one end of a fuel cell with zirconia, as well as the case of impregnating one end of a fuel cell with zirconia as presented in Patent Literatures 1 and 2, since zirconia has oxygen ion conductivity, there is the possibility of oxidation of one end of the fuel cell.

Furthermore, in the case of covering one end of a fuel cell with alumina, there is the possibility that the fuel cell sustains damage caused by the difference in thermal expansion coefficient.

Accordingly, an object of the invention is to provide a fuel cell capable of suppressing oxidation of one end thereof, a fuel cell module constructed by locating the fuel cell in a housing, a fuel cell device constructed by locating the fuel cell module in an exterior case, and a method of manufacturing the fuel cell.

Solution to Problem

The invention provides a fuel cell, configured to generate electric power by utilizing a fuel gas and an oxygen-containing gas, comprising:
a solid electrolyte layer;
a fuel electrode layer formed on one of opposite main surfaces of the solid electrolyte layer; and
an air electrode layer formed on the other of the main surfaces of the solid electrolyte layer; and
wherein an oxidation suppression layer is located closer to the fuel electrode layer than at least the solid electrolyte layer on one end of the fuel cell, the oxidation suppression layer being composed mainly of silicate containing at least one of elements belonging to Group 2 on the periodic table.

In such a fuel cell, the oxidation suppression layer is located closer to the fuel electrode layer than at least the solid electrolyte layer on one end of the fuel cell, the oxidation suppression layer being composed mainly of silicate containing at least one of the elements of Group 2 on the periodic table. This makes it possible to suppress oxidation of one end of the fuel cell and thereby impart enhanced reliability to the fuel cell.

Further, the invention provides a fuel cell, comprising:
a columnar conductive support substrate which contains Ni and $Y_2O_3$, and comprises a pair of opposite flat portions and a fuel gas flow channel configured to be passing through in a lengthwise direction therein for a flow of a fuel gas therethrough;
a fuel electrode layer, a solid electrolyte layer, and an air electrode layer laminated in that order on one of the flat portions; and
an interconnector laminated on the other of the flat portions, wherein
one end of the fuel cell is configured to be a non-power-generation portion in which the fuel electrode layer and the solid electrolyte layer are laminated in that order on the conductive support substrate without the air electrode layer being laminated thereon, and
one end of the non-power-generation portion comprises an oxidation suppression layer composed mainly of silicate containing at least one of elements belonging to Group 2 on the periodic table, at least on the conductive support substrate and the fuel electrode layer thereof.

In such a fuel cell, one end of the non-power-generation portion without the air electrode layer being laminated thereon comprises the oxidation suppression layer composed mainly of silicate containing at least one of the elements of Group 2 on the periodic table on the conductive support substrate and the fuel electrode layer thereof. This makes it possible to suppress (prevent) oxidation of the conductive support substrate and the fuel electrode layer resulting from backflow of an oxygen-containing gas flowing outside of the fuel cell.

Moreover, since the oxidation suppression layer is composed mainly of silicate containing at least one of the elements of Group 2 on the periodic table, it is possible to approximate the thermal expansion coefficient of the conductive support substrate which contains Ni and $Y_2O_3$ to the thermal expansion coefficient of the oxidation suppression layer, and thereby suppress damage to the fuel cell.

Moreover, in the invention, it is preferable that an outer corner at the one end of the fuel cell is chamfered in an area ranging from an outermost surface of the fuel cell to the conductive support substrate, excluding the oxidation suppression layer.

During the manufacture of the fuel cell, at the time of formation of the oxidation suppression layer composed mainly of silicate containing at least one of the elements of Group 2 on the periodic table, a thermal stress may possibly be concentrated on the end of the conductive support substrate, which leads to development of a crack in part of the oxidation suppression layer. If the crack grows for the worse, there arises the possibility of damage to the fuel cell. Furthermore, during the operation of a fuel cell device accommodating the fuel cell, in the fuel cell constituted so that an excess of fuel gas left unused after power generation is burned at one end thereof, there arises the possibility of damage to the fuel cell.

Here, by performing chamfering the outer corner at the one end of the fuel cell in the area ranging from the outermost surface of the fuel cell to the conductive support substrate excluding the oxidation suppression layer, it is possible to alleviate thermal stress concentration on the outer corner at the one end of the fuel cell, and thereby suppress damage to the oxidation suppression layer and the fuel cell more reliably.

Moreover, in the fuel cell of the invention, it is preferable that the oxidation suppression layer is formed on the solid electrolyte layer in the non-power-generation portion and on a part of the interconnector facing to the non-power-generation portion.

In such a fuel cell, since the oxidation suppression layer is formed on the solid electrolyte layer of the non-power-generation portion and on a part of the interconnector facing to the non-power-generation portion, it is possible to enhance the strength of one end of the fuel cell and thereby suppress damage to the fuel cell during manufacturing, as well as during power generation.

Moreover, in the fuel cell of the invention, it is preferable that a content of the silicate containing at least one of the elements of Group 2 on the periodic table is equal to or greater than 85 mol %.

In such a fuel cell, the silicate containing at least one of the elements of Group 2 on the periodic table is contained in the oxidation suppression layer in an amount of equal to or greater than 85 mol %. This makes it possible to render the oxidation suppression layer dense and thereby suppress oxidation of one end of the fuel cell more reliably.

Moreover, in the fuel cell of the invention, it is preferable that one of forsterite ($Mg_2SiO_4$), steatite ($MgSiO_3$), and wollastonite ($CaSiO_3$) is used as the silicate containing at least one of the elements of Group 2 on the periodic table.

In such a fuel cell, it is possible to approximate the thermal expansion coefficient of each layer constituting the fuel cell to the thermal expansion coefficient of the oxidation suppression layer, and thereby suppress damage to the fuel cell.

The invention provides a fuel cell module, comprising:
a housing; and
a plurality of the fuel cells according to any one of the types as set forth hereinabove located in the housing.

Such a fuel cell module is constructed by locating the plurality of fuel cells capable of suppressing oxidation of one end thereof in the housing, and therefore it is possible to provide the fuel cell module having enhanced reliability.

The invention provides a fuel cell device, comprising: an exterior case; the fuel cell module mentioned above; and an auxiliary device configured to operate the fuel cell module, wherein the fuel cell module and the auxiliary device are located inside the exterior case. Therefore, it is possible to provide the fuel cell device having enhanced reliability.

The invention provides a method of manufacturing a fuel cell, comprising the steps of:
preparing a stacked body comprising at least a fuel electrode layer and a solid electrolyte layer stacked on top of each other;
immersing one end of the stacked body in a solution composed mainly of silicate containing at least one of elements belonging to Group 2 on the periodic table; and
stacking a compact of an air electrode layer on a part of the solid electrolyte layer which is free from the silicate containing at least one of the elements of Group 2 on the periodic table, followed by performing firing.

According to such a fuel cell manufacturing method, it is possible to form an oxidation suppression layer composed mainly of silicate containing at least one of the elements of Group 2 on the periodic table on one end of the fuel cell. Accordingly, a highly reliable fuel cell can be manufactured with ease.

Moreover, in the method of manufacturing a fuel cell of the invention, it is preferable that the step of preparing the stacked body comprises forming a compact of a columnar conductive support substrate which contains Ni and $Y_2O_3$, and comprises a pair of opposite flat portions and fuel gas flow channel configured to be passing through in a lengthwise direction therein for a flow of a fuel gas, and producing a stacked body in which the fuel electrode layer and the solid electrolyte layer are laminated in that order on one of the flat portions of the conductive support substrate and the interconnector is laminated on the other of the flat portions of the conductive support substrate, by laminating a compact of the fuel electrode layer and a compact of the solid electrolyte layer in that order on one of the flat portions of the compact of the conductive support substrate, and a compact of the interconnector on the other of the flat portions of the compact of the conductive support substrate, and followed by performing co-firing.

According to such a fuel cell manufacturing method, it is possible to form an oxidation suppression layer composed mainly of silicate containing at least one of the elements of Group 2 on the periodic table on one end of the non-power-generation portion in which the fuel electrode layer and the solid electrolyte layer are laminated on one of the flat portions of the conductive support substrate without the air electrode layer being laminated thereon, so as to be located at least on the conductive support substrate and the fuel electrode layer. Accordingly, a highly reliable fuel cell can be manufactured with ease.

Moreover, in the method of manufacturing a fuel cell of the invention, it is preferable that, the method further comprises chamfering an outer corner at one end of the stacked body in an area ranging from an outermost surface of the stacked body to the conductive support substrate, after producing the stacked body in which the fuel electrode layer and the solid electrolyte layer are laminated in that order on one of the flat portions of the conductive support substrate and the interconnector is laminated on the other of the flat portions of the conductive support substrate.

According to such a fuel cell manufacturing method, it is possible to alleviate thermal stress concentration on the outer corner at one end of the fuel cell and thereby suppress development of a crack in the oxidation suppression layer, as well as suppress damage to the fuel cell.

Advantageous Effects of Invention

The fuel cell according to the invention configured to generate electric power by utilizing a fuel gas and an oxygen-containing gas, comprises the solid electrolyte layer; the fuel electrode layer formed on one of opposite main surfaces of the solid electrolyte layer; and the air electrode layer formed on the other of main surfaces of the solid electrolyte layer, wherein the oxidation suppression layer is located closer to the fuel electrode layer than at least the solid electrolyte layer one end of the fuel cell, the oxidation suppression layer being composed of mainly of silicate containing at least one of elements belonging to Group 2 on the periodic table. This makes it possible to suppress oxidation of one end of the fuel cell and thereby impart enhanced reliability to the fuel cell.

Moreover, the fuel cell according to the invention comprises the columnar conductive support substrate which contains Ni and $Y_2O_3$, and comprises a pair of opposite flat portions and a fuel gas flow channel configured to be passing through in a lengthwise direction therein for a flow of a fuel gas therethrough; the fuel electrode layer, the solid electrolyte layer, and the air electrode layer laminated in that order on one of the flat portions; and the interconnector laminated on the other of the flat portions, wherein one end of the fuel cell is configured to be the non-power-generation portion in which the fuel electrode layer and the solid electrolyte layer are laminated in that order on the conductive support substrate without the air electrode layer being laminated thereon, and one end of the non-power-generation portion comprises the oxidation suppression layer composed mainly of silicate containing at least one of the elements of Group 2 on the periodic table, at least on the conductive support substrate and the fuel electrode layer thereof. This makes it possible to suppress oxidation of one end of the fuel cell and thereby impart enhanced reliability to the fuel cell.

In addition, with the placement of such a fuel cell, highly reliable fuel cell module and fuel cell device can be provided.

Moreover, the method of manufacturing the fuel cell according to the invention comprises the step of preparing the stacked body comprising at least the fuel electrode layer and the solid electrolyte layer stacked on top of each other, the step of immersing one end of the stacked body in the solution composed mainly of silicate containing at least one of elements belonging to Group 2 on the periodic table, and the step of stacking the compact of the air electrode layer on the part of the solid electrolyte layer which is free from silicate containing at least one of the elements of Group 2 on the periodic table, followed by performing firing. This fuel cell manufacturing method allows easy manufacture of the fuel cell that is capable of suppressing oxidation of one end thereof and suppressing occurrence of damage.

BRIEF DESCRIPTION OF DRAWINGS

FIG. 2(a) is a cross sectional view, and FIG. 2(b) is a perspective view of FIG. 2(a);

DESCRIPTION OF EMBODIMENTS

Figure 1:
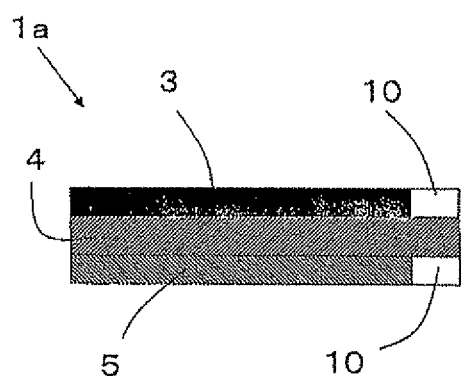
FIG. 1 is a vertical sectional view showing one end of a fuel cell of the invention.

FIG. 1 is a sectional view showing one end of a flat-type fuel cell 1a on a fuel-gas discharge side. In the following description, like components will be denoted by similar reference numerals or symbols.

In the fuel cell 1a of flat type, a fuel electrode layer 3 is formed on one of opposite main surfaces (upper main surface, as viewed in FIG. 1) of a solid electrolyte layer 4, and an air electrode layer 4 is formed on the other of the main surfaces (lower main surface, as viewed in FIG. 1) thereof. In the fuel cell 1a, a part of the fuel electrode layer 3 which faces (is opposed to) the air electrode layer 5 serves as a power-generation portion. That is, power generation is effected by passing an oxygen-containing gas such as air on the outside of the air electrode layer 5 (the outside of the fuel cell 1), passing a fuel gas (hydrogen-containing gas) on the fuel electrode layer 3 side, and applying heat to a predetermined operating temperature. Electric current resulting from the power generation is collected via a power collecting member (not shown). Hereinafter, constituent members of the fuel cell 1 as shown in FIG. 1 will be explained.

The fuel electrode layer 3 acts to induce an electrode reaction, and it is preferably made of electrically conductive porous ceramics which is heretofore known in itself. For example, the fuel electrode layer 3 may be made of $ZrO_2$ solid solution containing a rare earth element or $CeO_2$ solid solution containing a rare earth element, and Ni and/or NiO.

It is preferable that the content of $ZrO_2$ solid solution containing a rare earth element or $CeO_2$ solid solution containing a rare earth element in the fuel electrode layer 3 falls in a range of 35% to 65% by volume, and that the content of Ni or NiO therein falls in a range of 65% to 35% by volume. It is also preferable that a porosity of the fuel electrode layer 3 is equal to or greater than 15%, and more specifically falls in a range of 20% to 40%, and that the thickness thereof falls in a range of 1 μm to 30 μm. For example, when the fuel electrode layer 3 has too small a thickness, its performance capability can be deteriorated. On the other hand, if the fuel electrode layer 3 has too large a thickness, separation or the like trouble can occur between the fuel electrode layer 3 and the solid electrolyte layer 4 due to the difference in thermal expansion.

Dense ceramics made of partially stabilized or stabilized zirconia ($ZrO_2$) containing a rare earth element such as Y (yttrium), Sc (scandium) or Yb (ytterbium) in an amount of 3 to 15 mol % is desirably used for the solid electrolyte layer 4. Moreover, Y is desirably used for the rare earth element from the standpoint of inexpensiveness. The solid electrolyte layer 4 may also be constituted as a LSGM-based layer containing La (lanthanum), Sr (strontium), Ga (gallium), and Mg (magnesium). In the interest of prevention of gas permeation, it is preferable that the solid electrolyte layer 4 is configured to be dense so as to have a relative density (according to the Archimedes' method) of 93% or above, especially 95% or above, and that the thickness of the solid electrolyte layer 4 falls in a range of 1 μm to 50 μm.

The air electrode layer 5 is preferably formed of electrically conductive ceramics made of a so-called $ABO_3$ type perovskite oxide. As such a perovskite oxide, a transition metal perovskite oxide, especially, at least one of a $LaMnO_3$-based oxide, a $LaFeO_3$-based oxide and a $LaCoO_3$-based oxide which have La in the A-site is desirable for use. The use of a $LaCoO_3$-based oxide is particularly desirable because of its providing high electrical conductivity at an operating temperature of about 600 to 1000° C. The aforementioned perovskite oxide may contain Sr and Ca (calcium), in addition to La, in the A-site, or may contain Sm (samarium) and Sr in the A-site instead of La. In another alternative, the perovskite oxide may contain Fe (iron) and Mn (manganese), in addition to Co (cobalt), in the B-site.

Moreover, the air electrode layer 5 is required to exhibit gas permeability. Therefore, the electrically conductive ceramics (perovskite oxide) constituting the air electrode layer 5 preferably has a porosity of equal to or greater than 20%, especially a porosity in a range of 30% to 50%. Further, the air electrode layer 5 preferably has a thickness in a range from 30 μm to 100 μm in view of power collection capability.

In the fuel cell 1a of flat type thus constructed, there is the possibility that, around its one end (right-hand end, as viewed in FIG. 1), an oxygen-containing gas (such as air) flowing the outside of the fuel cell 1a flows toward the fuel electrode layer 3, with a consequent oxidation of one end of the fuel electrode layer 3. This may lead to damage to the fuel cell 1a.

Therefore, in the fuel cell 1a shown in FIG. 1, an oxidation suppression layer 10 is located closer to the fuel electrode layer 3 than at least the solid electrolyte layer 4 on one end of the fuel cell 1a, the oxidation suppression layer 10 being composed mainly of silicate containing at least one of the elements belonging to Group 2 on the periodic table. In the fuel cell 1a shown in FIG. 1, the oxidation suppression layer 10 is formed in both of a region at one end of the solid electrolyte layer 4 and a region at one end of the air electrode layer 5.

In this way, even when an oxygen-containing gas which is to be fed to the air electrode layer 5 side flows to the fuel electrode layer 3, quality degradation of the fuel electrode layer 3 can be suppressed, wherefore it is possible to provide the fuel cell 1a of flat type having enhanced reliability.

Examples of silicate containing at least one of the elements belonging to Group 2 on the periodic table, which is the major constituent of the oxidation suppression layer 10 (hereinafter also referred to simply as "silicate"), include: forsterite ($Mg_2SiO_4$), steatite ($MgSiO_3$), akermanite ($Ca_2MgSi_2O_7$), and diopside ($Ca_2MgSiO_6$) that contain Mg as the element of Group 2 on the periodic table; wollastonite ($CaSiO_3$), anorthite ($CaAl_2Si_2O_8$), and gehlenite ($Ca_2Al_2SiO_7$) that contain Ca as the element of Group 2 on the periodic table; and celsian ($BaAl_2Si_2O_8$) which contains Ba as the element of Group 2 on the periodic table. Appropriate selection of silicate for use is preferably made with consideration given to, for example, the thermal expansion coefficient of each component constituting the fuel cell 1a. In view of the thermal expansion coefficients of the fuel electrode layer 3 and the solid electrolyte layer 4, any one of forsterite ($Mg_2SiO_4$), steatite ($MgSiO_3$), and wollastonite ($CaSiO_3$) is desirable for use, in particular, forsterite ($Mg_2SiO_4$).

Moreover, in the interest of efficient suppression of oxidation of the fuel electrode layer 3, the oxidation suppression layer 10 is preferably dense. Therefore, the oxidation suppression layer 10 is preferably configured to be dense so as to have a relative density (according to the Archimedes' method) of 85% or above, especially 90% or above. This makes it possible to suppress oxidation of the fuel cell 1a (the fuel electrode layer 3) and thereby suppress damage to the fuel cell 1a.

To be specific, the oxidation suppression layer 10 preferably contains silicate in an amount of 85 mol % or above. This makes it possible to be dense so as to have a relative density (according to the Archimedes' method) of 85% or above, especially 90% or above, and thereby suppress damage to the fuel cell 1a.

For example, the fuel cell 1a of flat type can be manufactured in the following manner.

To begin with, for example, raw materials of NiO and $ZrO_2$ solid solution containing $Y_2O_3$ (YSZ) are subjected to weighing and mixing in accordance with a predetermined composition for preparation. After that, an organic binder and a solvent are blended into the resulting mixture powder, thereby preparing a slurry for the fuel electrode layer 3.

Then, water, a binder, a commercially available dispersant and so forth are added to powder of $ZrO_2$ solid solution containing a rare earth element to prepare a slurry, and then the slurry is subjected to spray drying or the like treatment to drive off water content, and is whereafter press-molded, thereby forming a compact of the solid electrolyte layer 4. The slurry for the fuel electrode layer 3 is applied to one of the main surfaces of the compact to form a compact of the fuel electrode layer 3.

Next, the resulting stacked compact is subjected to a binder removal treatment and is then co-sintered (co-fired) for 2 to 6 hours in an oxygen-containing atmosphere at a temperature in a range of 1400° C. to 1600° C. In such a fuel cell 1a manufacturing method, the aforestated procedural steps correspond to a process for preparation of a stacked body of the fuel electrode layer 3 and the solid electrolyte layer 4 laminated on top of each other.

Subsequently, a part of the stacked body which is to be formed with the oxidation suppression layer 10 is immersed in a solution containing silicate which contains at least one of the elements of Group 2 on the periodic table (for example, forsterite) in an amount of 95 wt % or above, a glass component, a solvent, and so forth, thereby forming a compact of the oxidation suppression layer 10. The compact is then sintered. The time for immersion may be appropriately determined so that the oxidation suppression layer 10 of intended thickness can be obtained.

Next, a slurry containing the material of formation of the air electrode layer 5 (for example, $LaCoO_3$-based oxide powder), a solvent, and a pore-forming agent is applied to the other main surface of the solid electrolyte layer 4 by means of dipping or otherwise, and is then baked for 2 to 6 hours at a temperature in a range of 1000° C. to 1300° C. In this way, the fuel cell 1a of flat type having the structure as shown in FIG. 1 can be manufactured.

The manufacturing method thus far described allows easy manufacture of the flat-type fuel cell 1a having the oxidation suppression layer 10 formed at one end thereof on the fuel-gas discharge side. The constituent components of the flat-type fuel cell 1a may be appropriately formed in accordance with heretofore known methods.

FIG. 2(a) shows a cross section of a fuel cell 1b of hollow flat type, and FIG. 2(b) is a partial cutaway perspective view of the fuel cell 1b. More specifically, FIG. 2(a) shows a cross section of the fuel cell taken along a power-generation portion which will hereinafter be described, and FIG. 2(b) is a perspective view of the fuel cell 1b cut away at the power-generation portion. Moreover, in both figures, part of the constituent components of the fuel cell 1b is illustrated in an enlarged state, for example.

Figure 2:
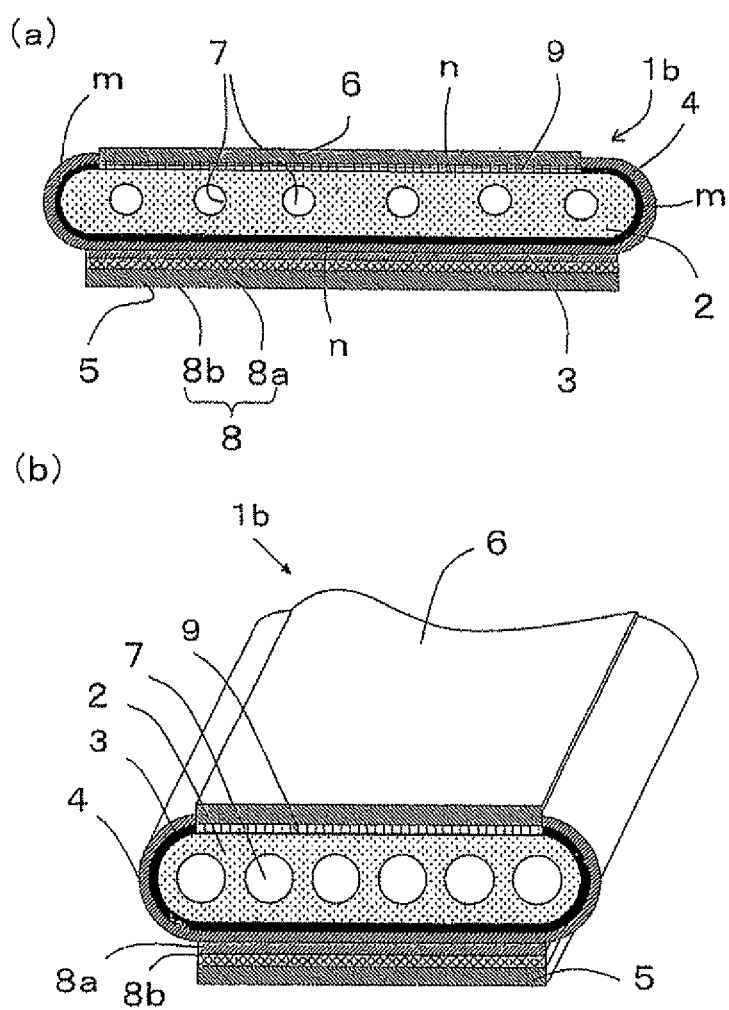
FIG. 2 is an example of the fuel cell in accordance with another embodiment of the invention.

The fuel cell 1b shown in FIG. 2 comprises a columnar conductive support substrate 2 having a pair of flat portions (indicated by a symbol n in FIG. 2(a)) and a plurality of fuel gas flow channels 7 configured to be passing through in the lengthwise direction therein for a flow of a fuel gas therethrough, and is constructed by laminating the fuel electrode layer 3, the solid electrolyte layer 4, and the air electrode layer 5 in that order on one flat portion n of the conductive support substrate 2, and an interconnector 6 on the other flat portion n.

To be more specific, the conductive support substrate 2 is composed of the paired flat portions n, and arcuate portions m at both ends thereof. The fuel electrode layer 3 is laminated so as to cover the one flat portion n and the arcuate portions m at both the ends, and the dense solid electrolyte layer 4 is laminated so as to cover the fuel electrode layer 3. Moreover, on the solid electrolyte layer 4, the air electrode layer 5 is laminated facing the fuel electrode layer 3, with an intermediate layer 8 lying therebetween. Further, the interconnector 6 is laminated on the surface of the other flat portion n where neither of the fuel electrode layer 3 nor the solid electrolyte layer 4 is laminated. The fuel electrode layer 3 and the solid electrolyte layer 4 are so formed as to extend, through the arcuate portions m at both the ends, to both sides of the interconnector 6, so that the surface of the conductive support substrate 2 can be kept in an unexposed state.

Here, in the fuel cell 1b shown in FIG. 2, a part of the fuel electrode layer 3 which faces (is opposed to) the air electrode layer 5 serves as a power-generation portion. That is, power generation is effected by passing an oxygen-containing gas such as air on the outside of the air electrode layer 5 (the outside of the fuel cell 1b), passing a fuel gas (hydrogen-containing gas) into the fuel gas flow channels 7 of the conductive support substrate 2, and applying heat to a predetermined operating temperature. Electric current resulting from the power generation is collected via the interconnector 6 put on the conductive support substrate 2. Hereinafter, constituent members of the fuel cell 1b as shown in FIG. 2 will be explained. As the fuel electrode layer 3, the solid electrolyte layer 4, and the air electrode layer 5 of the fuel cell 1b, those of the fuel cell 1a of flat type can be illustrated by way of example.

The conductive support substrate 2 is required to exhibit gas permeability for permeation of a fuel gas to the fuel electrode layer 4, and is also required to exhibit electrical conductivity for power collection via the interconnector 6. Therefore, for example, the conductive support substrate 2 is preferably made of an iron-group metal component and a specific rare, earth oxide. To be specific, Ni and/or NiO are preferably contained as the iron-group metal component because of their inexpensiveness and stability in a fuel gas. The rare earth oxide is used to approximate the thermal expansion coefficient of the conductive support substrate 2 to the thermal expansion coefficient of the solid electrolyte layer 4. As the rare earth oxide, $Y_2O_3$ is desirable for use. This is because $Y_2O_3$ exhibits very little solid-solubility with respect to Ni and/or NiO, reacts hardly with Ni and/or NiO, is substantially equal to the solid electrolyte layer 4 in terms of thermal expansion coefficient, and is not expensive.

Moreover, in order to maintain the electrical conductivity of the conductive support substrate 2 at a satisfactory level, as well as to approximate the thermal expansion coefficient of the conductive support substrate 2 to that of the solid electrolyte layer 4, Ni and $Y_2O_3$ are preferably used at a ratio by volume given as: Ni:$Y_2O_3$=35:65 to 65:35. It is noted that any other metal component or oxide component may be added to the conductive support substrate 2 so long as the required characteristics will not be impaired.

Moreover, since it is necessary to exhibit fuel gas permeability, in general, the conductive support substrate 2 preferably has a porosity of equal to or greater than 30%, especially a porosity in a range of 35% to 50%. Further, the electrical conductivity of the conductive support substrate 2 is preferably equal to or greater than 300 S/cm, especially equal to or greater than 440 S/cm.

It is preferable in general that the length of the flat portion n of the conductive support substrate 2 (the length of the conductive support substrate 2 in the widthwise direction) falls in a range of 15 mm to 35 mm; the length of the arcuate portion m (arc length) falls in a range of 2 mm to 8 mm; and the thickness of the conductive support substrate 2 (the dimension of the region between the flat portions n) falls in a range of 1.5 mm to 5 mm.

Moreover, depending upon the configuration of the fuel cell, the fuel electrode layer 3 and the air electrode layer 5 may be so configured as to serve also as the conductive support substrate 2.

As the fuel electrode layer 3, the same as the fuel electrode layer of the preceding example can be used. In the example shown in FIG. 2(a) and FIG. 2(b), the fuel electrode layer 3 is so formed as to extend to both sides of the interconnector 6. However, since it is essential only that the fuel electrode layer 3 be formed facing the air electrode layer 5, for example, the fuel electrode layer 3 may be formed only on the flat portion n at a side on which the air electrode layer 5 is provided.

In the fuel cell 1b shown in FIG. 2, the intermediate layer 8 may be interposed between the solid electrolyte layer 4 and the air electrode layer 5 for the purpose of suppressing deterioration in the power generation capability of the fuel cell 1b which may be caused by long-term use for power generation. In the case of providing the intermediate layer 8, the intermediate layer 8 is preferably configured to have a double-layer structure composed of a first layer 8a for increasing the strength of connection with the solid electrolyte layer 4 and a second layer 8b for suppressing formation of a reaction layer having high electrical resistance resulting from reactions of the components constituting the solid electrolyte layer 4 and the air electrode layer 5.

To be specific, the first layer 8a and the second layer 8b are preferably made to contain the same rare earth element (except for the element contained in the air electrode layer 5). This makes it possible to approximate the thermal expansion coefficient of the first layer 8a to that of the second layer 8b, and thereby increase the strength of bonding between the first layer 8a and the second layer 8b. The reason for excluding the element contained in the air electrode layer 5 is to suppress effectively the formation of a reaction layer having high electrical resistance that occurs when a component contained in the solid electrolyte layer 4 (for example, Zr) is diffused into the intermediate layer 8 due to long-term power generation, and consequently the diffused component reacts with the component contained in the air electrode layer 5.

Examples of the rare earth element common to the first and second layers include Ce (cerium). Particularly, in forming the first layer 8a and the second layer 8b, it is desirable to use Ce raw material powder having a composition defined by the following formula:

$$(CeO_2)_{1-x}(REO_{1.5})_x \qquad (1)$$

wherein RE represents at least one of Sm, Y, Yb, and Gd, and x represents a number which fulfills the following condition: $0<x\leq0.3$. Further, it is desirable to use raw material powder of $CeO_2$ solid solution containing Sm, Gd that has a composition defined by the following formulae:

$$(CeO_2)_{1-x}(SmO_{1.5})_x \quad (2)$$

$$(CeO_2)_{1-x}(GdO_{1.5})_x \quad (3)$$

wherein x represents a number which fulfills the following condition: $0<x\leq0.3$.

Moreover, in the interest of reduction of electrical resistance, $CeO_2$ solid solution containing $SmO_{1.5}$ or $GdO_{1.5}$ in an amount of 10 to 20 mol % is suitable for use. It is noted that raw material powder of $CeO_2$ may contain any other rare earth oxide (for example, $Y_2O_3$ and $Yb_2O_3$) to enhance the effect of blocking or suppressing the diffusion of Zr contained in the solid electrolyte layer 4.

Meanwhile, the other flat portion n of the conductive support substrate 2 may be provided with a layer 9 which is similar to the fuel electrode layer 3 (hereinafter also referred to as "tightly adherent layer 9") to reduce the difference in thermal expansion coefficient between the interconnector 6 and the conductive support substrate 2. In FIG. 2, there is shown the case where the tightly adherent layer 9 is interposed between the interconnector 6 and the conductive support substrate 2. That is, the tightly adherent layer 9 may be made of $ZrO_2$ solid solution containing a rare earth element or $CeO_2$ solid solution containing a rare earth element, and Ni and/or NiO. The content of Ni and/or NiO may be either the same as or different from that of the fuel electrode layer 3.

The interconnector 6, which is disposed on the conductive support substrate 2, with the tightly adherent layer 9 lying therebetween, facing the air electrode layer 5, is preferably made of electrically conductive ceramics. The interconnector 6 is exposed to a fuel gas (hydrogen-containing gas) and an oxygen-containing gas, and is therefore required to exhibit resistance to reduction and resistance to oxidation. As the conductive ceramics having resistance to reduction and oxidation, in general, a lanthanum chromite-based perovskite-type oxide ($LaCrO_3$-based oxide) is used. Moreover, in order to prevent the leakage of a fuel gas passing through the interior of the conductive support substrate 2 and an oxygen-containing gas passing over the exterior of the conductive support substrate 2, the conductive ceramics is required to be dense. It is thus preferable that the conductive ceramics has a relative density of, for example, 93% or above, especially 95% or above. The interconnector 6 may be made of metal conforming to the shape of the fuel cell.

Moreover, the interconnector 6 preferably has a thickness in a range of 10 μm to 500 μm in the interest of gas leakage prevention and electrical resistance reduction. When the thickness deviates from this range to become smaller, gas leakage is likely to occur. On the other hand, when the thickness deviates from this range to become greater, electrical resistance becomes so large that the power collection capability can be deteriorated due to potential drop.

Moreover, although not illustrated in the figure, a P-type semiconductor layer may be formed on the outer surface (top surface) of the interconnector 6. By connecting the power collecting member to the interconnector 6 via the P-type semiconductor layer, it is possible to establish ohmic contact between them and thereby lessen the degree of potential drop, wherefore deterioration in power collection capability can be avoided effectively. Likewise, a P-type semiconductor layer is preferably formed also on the top surface of the air electrode layer 5.

As such a P-type semiconductor layer, a layer made of a transition metal perovskite-type oxide can be exemplified. To be specific, the semiconductor layer is preferably made of an oxide which is higher in electron conductivity than the lanthanum chromite-based perovskite-type oxide ($LaCrO_3$) constituting the interconnector 6, for example, at least one of a $LaSrCoFeO_3$-based oxide (for example, $LaSrCoFeO_3$), a $LaMnO_3$-based oxide (for example, $LaSrMnO_3$), a $LaFeO_3$-based oxide (for example, $LaSrFeO_3$), and a $LaCoO_3$-based oxide (for example, $LaSrCoO_3$) that have Sr and La coexisting in the A-site. The use of a $LaSrCoFeO_3$-based oxide is particularly desirable because of its high electrical conductivity under a condition of an operating temperature in a range of 600° C. to 1000° C. In general, the P-type semiconductor layer preferably has a thickness in a range of 30 μm to 100 μm.

In the fuel cell 1b shown in FIG. 2, one end of the fuel cell 1b is formed as a non-power-generation portion in which the fuel electrode layer 3 and the solid electrolyte layer 4 are laminated in that order on the conductive support substrate 2 without the air electrode layer 5 being laminated thereon.

In such a non-power-generation portion, there is the possibility of backflow of an oxygen-containing gas (such as air) flowing the outside of the fuel cell 1b that will eventually cause oxidation of part (one end) of the conductive support substrate 2 and one end of the fuel electrode layer 3. This may lead to damage to the fuel cell 1b.

Therefore, in the fuel cell 1b shown in FIG. 2, one end of the non-power-generation portion comprises an oxidation suppression layer 10 composed mainly of silicate containing at least one of the elements belonging to Group 2 on the periodic table, at least on the conductive support substrate 2 and the fuel electrode layer 3.

Figure 3:
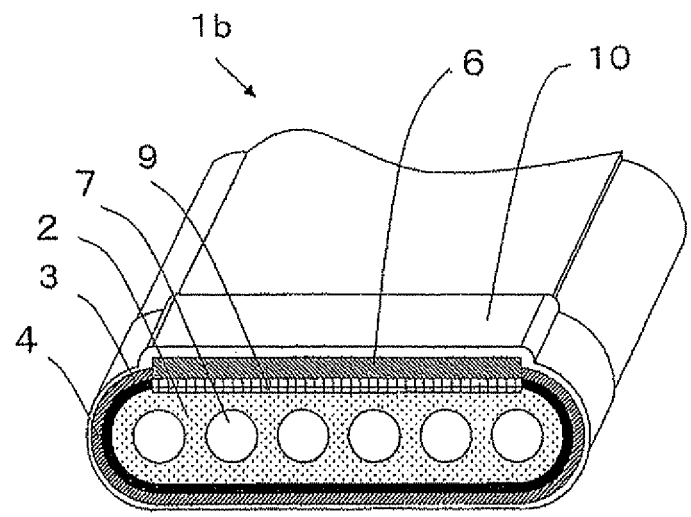
FIG. 3 is a perspective view of one end of the fuel cell shown in FIG. 2.
Figure 4:
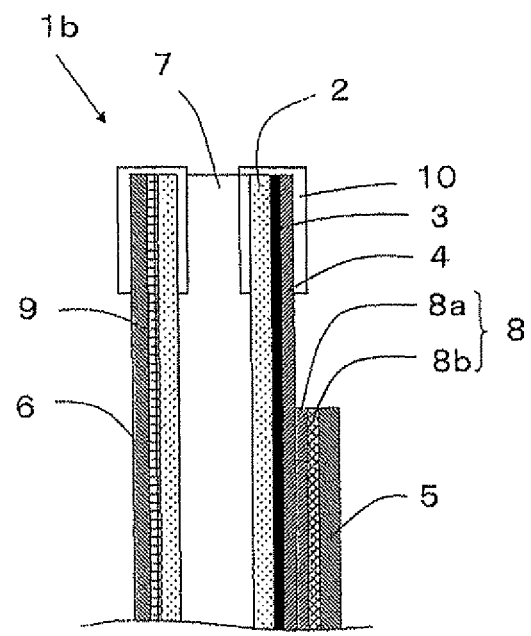
FIG. 4 is a vertical sectional view of one end of the fuel cell shown in FIG. 2

FIG. 3 is a perspective view of one end of the fuel cell 1b shown in FIG. 2, and FIG. 4 is a sectional view of one end of the fuel cell 1b shown in FIG. 2, with a fuel gas flow channel 7 in section along the lengthwise direction.

In the fuel cell 1b shown in FIG. 3, in the non-power-generation portion in which the fuel electrode layer 3 and the solid electrolyte layer 4 are laminated in that order on the conductive support substrate 2 without the air electrode layer 5 being laminated thereon, the oxidation suppression layer 10 is so formed as to cover the solid electrolyte layer 4 and the interconnector 6 (namely, the oxidation suppression layer 10 is located at least on the conductive support substrate 2 and the fuel electrode layer 3, or in other words, the oxidation suppression layer 10 is located closer to the fuel electrode layer 3 than the solid electrolyte layer 4). Moreover, as shown in FIG. 4, at the end of the conductive support substrate 2, the oxidation suppression layer 10 is so formed as to cover the outer surface of the conductive support substrate 2.

As the silicate containing at least one of the elements of Group 2 on the periodic table, which is the major constituent of the oxidation suppression layer 10 located on one end of the non-power-generation portion of the fuel cell 1b so as to be located at least on the conductive support substrate 2 and the fuel electrode layer 3, the same as that employed in the preceding example can be used. In the fuel cell 1b having the conductive support substrate 2 containing Ni and $Y_2O_3$ in particular, with consideration given to the thermal expansion coefficient of the conductive support substrate 2, it is desirable to use one of forsterite ($Mg_2SiO_4$), steatite ($MgSiO_3$), and wollastonite ($CaSiO_3$), and it is especially desirable to use forsterite ($Mg_2SiO_4$). Moreover, likewise, the oxidation suppression layer 10 is preferably made to be dense so as to have a relative density (according to the Archimedes' method) of 85% or above, especially 90% or above. This makes it possible to suppress oxidation of the fuel cell 1b and thereby suppress damage to the fuel cell 1b.

To be specific, the oxidation suppression layer 10 preferably contains silicate in an amount of 85 mol % or above. This makes it possible to render the oxidation suppression layer dense so as to have a relative density (according to the Archimedes' method) of 85% or above, especially 90% or above as mentioned above, and thereby suppress damage to the fuel cell 1b.

Figure 5:
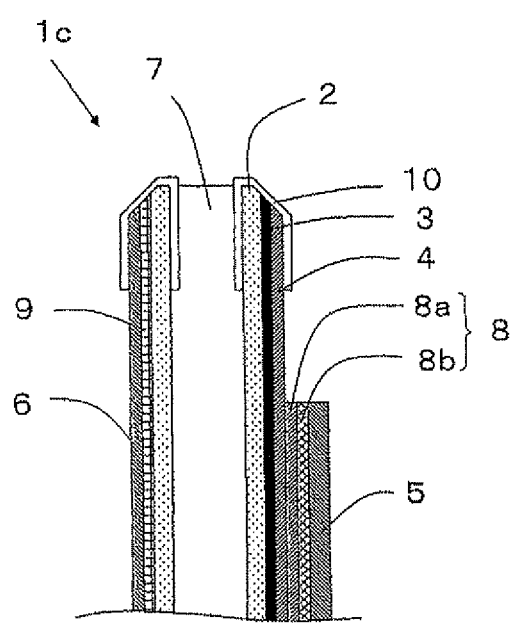
FIG. 5 is a vertical sectional view of a fuel cell in accordance with another embodiment of the invention.
Figure 6:
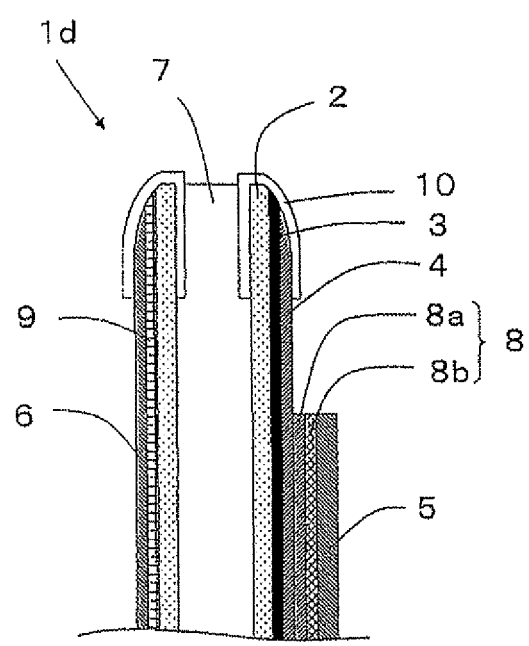
FIG. 6 is a vertical sectional view of a fuel cell in accordance with further another embodiment of the invention.

FIGS. 5 and 6 are each a vertical sectional view of a fuel cell in accordance with another embodiment of the invention, and each a sectional view illustrating one end of the fuel cell 1c, 1d, with a fuel gas flow channel 7 in section along the lengthwise direction.

The foregoing fuel cell 1b of hollow flat type is constructed by disposing a compact of the oxidation suppression layer 10 composed mainly of silicate at one end of a stacked body formed by laminating the layers constituting the fuel cell 1b (including the fuel electrode layer 3, for example) on top of each other on the conductive support substrate 2, followed by performing firing. However, in the course of application of heat for the firing, a thermal stress may possibly be developed at one end of the fuel cell 1b. Furthermore, in the fuel cell 1b constituted so that the fuel gas left unused after power generation is burned at one end thereof on the fuel-gas discharge side, in the course of burning the excess fuel gas, a thermal stress may possibly be developed at one end of the fuel cell 1b. This may lead to development of a crack in a part of the oxidation suppression layer 10 and thus to damage to the fuel cell 1b.

Therefore, in the fuel cells 1c and 1d as shown in FIGS. 5 and 6, respectively, in order to relax a thermal stress resulting from firing or burning of fuel gas, an outer corner at one end thereof, especially one end thereof on the fuel-gas discharge side, is chamfered in an area ranging from an outermost surface of the fuel cell 1 to the conductive support substrate 2, excluding the oxidation suppression layer 10.

Here, in the fuel cell 1c shown in FIG. 5, an outer corner at one end thereof is chamfered in the area ranging from the outermost surface of the fuel cell 1c to the conductive support substrate 2, excluding the oxidation suppression layer 10, to provide a C face after chamfering. On the other hand, in the fuel cell 1d shown in FIG. 6, an outer corner at one end thereof is chamfered in the area ranging from the outermost surface of the fuel cell 1d to the conductive support substrate 2, excluding the oxidation suppression layer 10, to provide an R face after round chamfering. As shown in FIGS. 5 and 6, the oxidation suppression layer 10 is formed on each of the chamfered outermost surfaces. That is, the oxidation suppression layer 10 is so formed as to cover the solid electrolyte layer 4 and the interconnector 6 (namely, the oxidation suppression layer 10 is located at least on the conductive support substrate 2 and the fuel electrode layer 3, or, in other words, the oxidation suppression layer 10 is located closer to the fuel electrode layer 3 than the solid electrolyte layer 4).

In this way, thermal stress concentration on the outer corner at one end of the fuel cell on the fuel-gas discharge side can be alleviated, wherefore a development of a crack in the oxidation suppression layer 10 can be suppressed during manufacturing of the fuel cell 1c, 1d. This makes it possible to suppress more reliably damage to the fuel cell 1c, 1d during manufacturing, as well as during operation of a fuel cell device having the fuel cell 1c, 1d housed therein.

In the fuel cell 1c or the fuel cell 1d, the dimension of the chamfer at the outer corner of one end thereof may be determined arbitrarily so long as it exerts no influence upon the fuel gas flow channel 7. For example, given the thickness of the conductive support substrate 2 of 2 mm, then it is preferable that the length from an end of the fuel gas flow channel 7 of the conductive support substrate 2 (an end of the opening of the fuel gas flow channel 7) to the corner after chamfering is set at least at 400 μm or above, with consideration given to the strength of one end of the conductive support substrate 2 and so forth.

Moreover, as the chamfer configuration of the outer corner at one end of the fuel cell 1b, in addition to the aforementioned C face or R face, a combination of C face and R face, or a heretofore known chamfer configuration may also be appropriately adopted.

Further, as has already been described, in the fuel cell constituted so that the fuel gas left unused after power generation is burned at one end thereof on the fuel-gas discharge side, when the excess fuel gas is burned on the fuel-gas discharge side, one end of the fuel cell may be particularly susceptible to concentration of thermal stress entailed by application of heat. This may lead to damage to the fuel cell.

Therefore, in the fuel cell of hollow flat type as shown in FIGS. 3 to 6, the oxidation suppression layer 10 is located on the solid electrolyte layer 4 in the non-power-generation portion and on a part of the interconnector 6 facing to the non-power-generation portion.

That is, one end of the fuel cell on the fuel-gas discharge side is covered with the oxidation suppression layer 10 containing silicate as a major constituent. This makes it possible to increase the thickness of one end on the fuel-gas discharge side and thereby enhance the strength of one end on the fuel-gas discharge side. As a result, it is possible to suppress damage to the fuel cell caused by combustion heat generated in the burning of the excess fuel gas.

It is noted that the thickness of the oxidation suppression layer 10 may be appropriately determined. For example, the oxidation suppression layer 10 situated at the end face of one end on the fuel-gas discharge side may be given a thickness in a range of 50 μm to 120 μm, whereas the oxidation suppression layer 10 situated on the conductive support substrate 2 within the fuel gas flow channel 7 at one end on the fuel-gas discharge side may be given a thickness in a range of 30 μm to 60 μm. In this case, the oxidation suppression layer 10 situated on the solid electrolyte layer 4 as well as the interconnector 6 may be given a thickness in a range of 20 μm to 50 μm. In this way, oxidation of the conductive support substrate 2 at one end on the fuel-gas discharge side can be suppressed, and also the strength of one end on the fuel-gas discharge side can be increased. This makes it possible to suppress damage to the fuel cell.

Now, a description will be given as to a method of manufacturing the foregoing fuel cell 1b of hollow flat type according to one embodiment of the invention. The following description deals with the case where the intermediate layer 8 has a double-layer structure composed of the first layer 8a and the second layer 8b.

To begin with, powder of Ni or NiO, powder of $Y_2O_3$, an organic binder, and a solvent are mixed together to prepare a pug. The pug is subjected to extrusion molding to form a compact of the conductive support substrate 2 having a pair of flat portions, and arcuate portions at both ends thereof. The compact is then dried. As the compact of the conductive support substrate 2, a calcined body obtained by calcining the compact of the conductive support substrate 2 for 2 to 6 hours at a temperature in a range of 900° C. to 1000° C. may be used.

Next, for example, raw materials of NiO and $ZrO_2$ solid solution containing $Y_2O_3$ (YSZ) are subjected to weighing and mixing in accordance with a predetermined composition for preparation. After that, an organic binder and a solvent are blended into the resulting mixture powder, thereby preparing a slurry for the fuel electrode layer 3.

Then, toluene, a binder, a commercially available dispersant, and so forth are added to powder of $ZrO_2$ solid solution containing a rare earth element to prepare a slurry, and then the slurry is formed into a sheet-like compact of the solid electrolyte layer 4 having a thickness in a range of 3 µm to 75 µm by means of the doctor blade technique or otherwise. Onto the sheet-like compact of the solid electrolyte layer 4 thus obtained is applied the slurry for the fuel electrode layer 3 to form a compact of the fuel electrode layer 3. The resultant is laminated, with its surface bearing the compact of the fuel electrode layer 3 confronted by the compact of the conductive support substrate 2 so as to extend from one of the flat portions to the arcuate portions at both ends of the compact of the conductive support substrate 2. Alternatively, it may be laminated so as to extend to a part of the other flat portion.

Subsequently, for example, powder of $CeO_2$ solid solution containing $GdO_{1.5}$ is subjected to heat treatment for 2 to 6 hours at a temperature in a range of 800° C. to 900° C., and is whereafter wet-crushed, with the degree of agglomeration adjusted to fall in a range of 5 to 35, to prepare raw material powder for a compact of the intermediate layer 8. The wet-crushing is preferably continued for 10 to 20 hours with use of a solvent by means of ball milling. It is noted that the same holds true for a case where the intermediate layer 8 is made of powder of $CeO_2$ solid solution containing $SmO_{1.5}$.

As a solvent, toluene is added to the raw material powder for the compact of the intermediate layer 8 in which the degree of agglomeration has been adjusted properly, thereby preparing a slurry for the intermediate layer 8. The slurry is applied to a predetermined location on the compact of the solid electrolyte layer 4 to form a coating layer of the first intermediate layer 8a. In this way, a compact of the first layer 8a is formed. Alternatively, a sheet-like compact of the first layer 8a may be formed and then be laminated on the compact of the solid electrolyte layer 4.

Next, for example, raw materials of NiO and $ZrO_2$ solid solution containing $Y_2O_3$ (YSZ) are subjected to weighing and mixing in accordance with a predetermined composition for preparation. After that, an organic binder and a solvent are blended into the resulting mixture powder, thereby preparing a slurry for the tightly adherent layer 9.

Subsequently, the material of formation of the interconnector 6 (for example, $LaCrO_3$-based oxide powder), an organic binder, and a solvent are mixed together to form a slurry, and the slurry is formed into a sheet-like compact of the interconnector 6 by means of the doctor blade technique or otherwise.

The slurry for the tightly adherent layer 9 is applied to one of the surfaces of the compact of the interconnector 6. The resultant is laminated, with its surface bearing the slurry for the tightly adherent layer 9 confronted by the other flat portion of the compact of the conductive support substrate 2 where neither of the compact of the fuel electrode layer 3 nor the compact of the solid electrolyte layer 4 is formed.

Next, the resulting stacked compact is subjected to a binder removal treatment and is then co-sintered (co-fired) for 2 to 6 hours in an oxygen-containing atmosphere at a temperature in a range of 1400° C. to 1600° C. In such a fuel cell 1b manufacturing method, the aforestated procedural steps correspond to a process for preparation of a stacked body of the fuel electrode layer 3 and the solid electrolyte layer 4 laminated on top of each other.

After that, the slurry for the intermediate layer 8 is applied to the surface of the sintered product of the first layer 8a, thereby forming a compact of the second layer 8b.

Subsequently, a part of the resultant which is to be formed with the oxidation suppression layer 10 is immersed in a solution containing silicate which contains at least one of the elements belonging to Group 2 on the periodic table (for example, forsterite) in an amount of 95 wt % or above, a glass component, a solvent, and so forth, thereby forming a compact of the oxidation suppression layer 10. The time for immersion may be appropriately determined so that the oxidation suppression layer 10 of intended thickness can be obtained. In the case of forming the oxidation suppression layer 10 only at the end of the conductive support substrate 2, the oxidation suppression layer 10 can be formed by applying a raw material for the oxidation suppression layer 10 (slurry) to the end of the conductive support substrate 2.

Next, the compact of the second layer 8b and the compact of the oxidation suppression layer 10 are sintered to form the second layer 8b and the oxidation suppression layer 10. It is preferable that the compact of the second layer 8b and the compact of the oxidation suppression layer 10 are sintered at a temperature of at least 200° C. lower than the temperature at which the solid electrolyte layer 4 and the first layer 8a are co-sintered, for example, at a temperature in a range of 1200° C. to 1400° C. It is advisable that the time for sintering is set at 2 to 6 hours in order for the first layer 8a and the second layer 8b to be tightly bonded to each other.

Subsequently, a slurry containing the material for formation of the air electrode layer 5 (for example, $LaCoO_3$-based oxide powder), a solvent, and a pore-forming agent is applied onto the intermediate layer 8 (the second layer 8b) by means of dipping or otherwise. Moreover, as needed, a slurry containing a P-type semiconductor layer material (for example, $LaCoO_3$-based oxide powder) and a solvent is applied to a predetermined location of the interconnector 6 by means of dipping or otherwise, and is then baked for 2 to 6 hours at a temperature in a range of 1000° C. to 1300° C. In this way, the fuel cell 1b having the structure as shown in FIG. 2 can be manufactured. It is desirable to feed a hydrogen-containing gas into the manufactured fuel cell 1b to perform a reduction treatment on the conductive support substrate 2 and the fuel electrode layer 3. At this time, the reduction treatment is preferably continued for 5 to 20 hours at a temperature in a range of 750° C. to 1000° C.

In chamfering the outer corner at one end of the fuel cell 1b on the fuel-gas discharge side in the area ranging from the outermost surface of the fuel cell to the conductive support substrate 2 excluding the oxidation suppression layer 10, it is advisable that, after the sintering of the stacked body obtained by laminating the compact of the fuel electrode layer 3, the compact of the solid electrolyte layer 4, and the first layer 8a on one flat portion of the compact of the conductive support substrate 2 and the compact of the interconnector 6 on the other flat portion, chamfering (chamfering for C face, chamfering for R face, or the like) is performed in the area ranging from the outermost surface of the stacked body to the conductive support substrate 2. The chamfering can be effected with use of Leutor, sand paper, a jig, a surface grinding machine, and so forth.

The manufacturing method thus far described allows easy manufacture of the highly reliable fuel cell 1b that has the oxidation suppression layer 10 formed at one end of the conductive support substrate 2 on the fuel-gas discharge side and is therefore capable of suppression of oxidation of the conductive support substrate 2 and thus suppression of damage to the construction.

Figure 7:
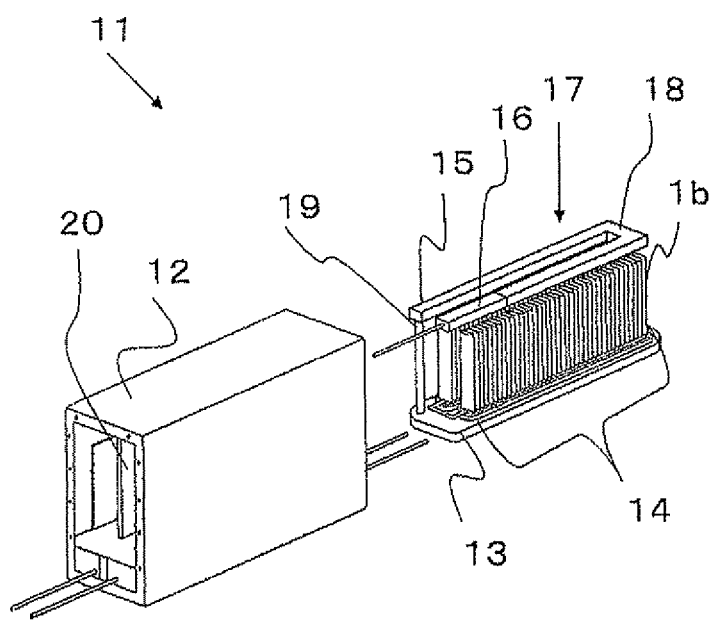
FIG. 7 is an external perspective view showing a fuel cell module according to the invention.

FIG. 7 is an external perspective view showing one embodiment of a fuel cell module according to the invention (hereinafter also referred to as "module" for short) in which like components will be denoted by similar reference numerals or symbols. The following description deals with the case where the fuel cell 1b of hollow flat type is used as a fuel cell constituting the module.

The module 11 is constructed by locating, in a rectangular parallelepiped-shaped housing 12, a fuel cell stack device 17 composed of a cell stack 14 in which a plurality of hollow-flat type fuel cells 1b according to one embodiment of the invention are arranged in an upstanding state at a predetermined spacing and the adjacent fuel cells 1b are electrically connected in series with each other via a power collecting member (not shown), the lower ends of the fuel cells 1b being secured to a manifold 13 by an insulating bonding member (not shown) such as a glass seal material.

Referring to FIG. 7, in order to obtain a fuel gas used for power generation by the fuel cell 1b, a reformer 18 for producing a fuel gas by reforming a fuel such as a natural gas and kerosene oil is disposed above the cell stack 14 (fuel cells 1). The reformer 18 as shown in FIG. 7 is composed of a vaporizing section 16 for water vaporization and a reforming section 15 having a reforming catalyst. By virtue of the reformer 18, steam reforming can be conducted efficiently. The fuel gas produced by the reformer 18 is delivered to the manifold 13 through a gas passage tube 19 and is then fed, through the manifold 13, to the fuel gas flow channel 7 formed within the fuel cell 1b. It is noted that the fuel cell stack device 17 may be configured to include the reformer 18.

It is noted that FIG. 7 shows the housing 12 with parts (front and rear surfaces) removed and the internally-formed fuel cell stack device 17 in a state of being situated just behind the housing 12 after detachment. In the module 11 shown in FIG. 7, the fuel cell stack device 17 can be slidingly accommodated in the housing 12.

In the interior of the housing 12 is placed an oxygen-containing gas admitting member 21 located between the cell stacks 14 arranged side by side on the manifold 13, for allowing an oxygen-containing gas to flow laterally in a direction from the lower end to the upper end of the fuel cell 1b through the inside of the power collecting member.

The module 11 is constructed by locating a plurality of fuel cells 1b as described above in the housing 12, and therefore it is possible to provide the module 11 having enhanced reliability.

Figure 8:
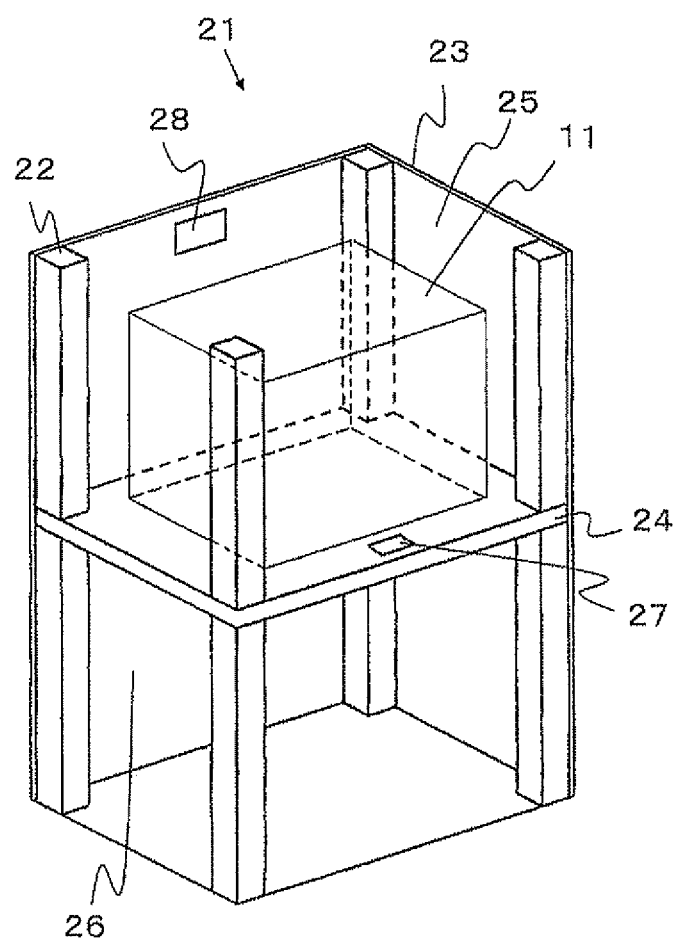
FIG. 8 is a schematic view schematically showing a fuel cell device.

FIG. 8 is an exploded perspective view showing one embodiment of a fuel cell device 21 according to the invention. In FIG. 8, part of the structure of the fuel cell device is omitted.

The fuel cell device 21 shown in FIG. 8 includes an exterior case composed of a support column 22 and a covering plate 23. The interior of the exterior case is partitioned into an upper part and a lower part by a partition plate 24. The upper part constitutes a module housing chamber 25 for housing the module 11, whereas the lower part constitutes an auxiliary housing chamber 26 for housing auxiliary devices for operating the module 11. The auxiliary devices housed in the auxiliary housing chamber 26 are not shown.

Moreover, the partition plate 24 is formed with an air flow port 27 for allowing air in the auxiliary housing chamber 26 to flow toward the module housing chamber 25. Further, an exhaust port 28 for discharging air in the module housing chamber 25 is formed in a part of the covering plate 23 constituting the module housing chamber 25.

The fuel cell device 21 is constructed by locating the highly reliable module 11, which is constructed by locating the fuel cells 1b in the housing 12 as has already been described, in the module housing chamber 25, and therefore it is possible to provide the fuel cell device 21 having enhanced reliability.

EXAMPLES

The following experiments were carried out on fuel cells of hollow flat type.

To begin with, NiO powder having an average particle size of 0.5 μm and $Y_2O_3$ powder having an average particle size of 0.9 μm were mixed in such a way that the proportion of NiO was 48% by volume and the proportion of $Y_2O_3$ was 52% by volume after firing as well as reduction. The resulting mixture, an organic binder, and a solvent were mixed to prepare a pug, and the pug was subjected to extrusion molding, drying, and degreasing treatment, thereby forming a compact of the conductive support substrate. It is noted that, in forming Test sample No. 1, the powder materials were mixed in such a way that the proportion of NiO was 45% by volume and the proportion of $Y_2O_3$ was 55% by volume after firing as well as reduction for $Y_2O_3$ powder.

Next, with use of a slurry obtained by mixing powder of $ZrO_2$ solid solution containing Y in an amount of 8 mol %, whose particle size was 0.8 μm (measured by Micro-track method) (raw-material powder for the solid electrolyte layer), an organic binder, and a solvent, a 30 μm-thick sheet for the solid electrolyte layer was formed by the doctor blade technique. The sheet for the solid electrolyte layer was attached onto a coating layer for the fuel electrode layer, followed by performing drying. It is noted that, in Test sample No. 2, the particle size of $ZrO_2$ powder was 1.0 μm, and, in Test sample No. 3, the thickness of the sheet for the solid electrolyte layer was 40 μm.

Next, a slurry for the fuel electrode layer was prepared by mixing powder of NiO having an average particle size of 0.5 μm, powder of $ZrO_2$ solid solution containing $Y_2O_3$ in an amount of 8 mol %, an organic binder, and a solvent. The slurry for the fuel electrode layer was applied onto the sheet for the solid electrolyte layer.

The sheet for the solid electrolyte layer was laminated, with its surface bearing the slurry for the fuel electrode layer confronted by the compact of the conductive support substrate so as to extend from one of the flat portions to the other of the conductive support substrate.

Subsequently, the stacked compact obtained by laminating the compacts as described above was dried, and whereafter was calcined for 3 hours at a temperature of 1000° C.

Next, a composite oxide containing $CeO_2$ in an amount of 85 mol % and one of other rare earth oxides ($SmO_{1.5}$ in Test sample No. 1, $GdO_{1.5}$ in Test samples No. 2 to No. 7) in an amount of 15 mol % was pulverized in the presence of isopropyl alcohol (IPA) as a solvent by a vibration mill or a ball mill, and whereafter was calcined for 4 hours at a temperature of 900° C. The calcined particles were crushed once again by the ball mill while adjusting the degree of agglomeration of ceramic particles properly, thereby preparing raw material powder for the intermediate layer. An acrylic binder and toluene were admixed in the powder to form a slurry for the intermediate layer. The slurry was applied onto the calcined product of the solid electrolyte layer of the calcined stacked body by means of screen printing. In this way, a compact of the first layer was formed.

Next, a slurry for the tightly adherent layer was prepared by mixing powder of NiO having an average particle size of 0.5 μm, powder of $ZrO_2$ solid solution containing $Y_2O_3$ in an amount of 8 mol %, an organic binder, and a solvent.

Subsequently, with use of a slurry for the interconnector obtained by mixing a $LaCrO_3$-based oxide, an organic binder, and a solvent, a 30 μm-thick sheet for the interconnector was formed by the doctor blade technique. The slurry for the tightly adherent layer was applied to one of the surfaces of the sheet for the interconnector. The resultant was laminated, with its surface bearing the slurry for the tightly adherent layer confronted by the other flat portion of the compact of the conductive support substrate where neither of the compact of the fuel electrode layer nor the compact of the solid electrolyte layer was formed.

Then, the stacked body obtained by laminating those layers was co-fired for 3 hours in the atmosphere at a temperature of 1510° C.

Moreover, subsequent to the aforestated process steps, in Test samples No. 6 and No. 7, the outer corners at one ends thereof on the fuel-gas discharge side were chamfered and round-chamfered to provide a C face and an R face after chamfering, respectively. It is noted that the C face and R face were processed so that the lengths from the end of the fuel gas flow channel to their corners after chamfering and round chamfering were 500 μm, respectively.

channel was 1 mm. The thickness of the conductive support substrate (the dimension of the region between the opposite flat portions n) was 2.5 mm, and the porosity thereof was 35%. The thickness of the fuel electrode layer was 10 μm, and the porosity thereof was 24%. The thickness of the air electrode layer was 50 μm, the porosity thereof was 40%, and the relative density thereof was 97%. The thickness of the tightly adherent layer is 20 μm.

Ten fuel cells were formed for each test sample on an individual basis. The front end of each of the fabricated fuel cell was observed by a scanning electron microscope to check the presence of a crack.

By way of comparative examples, Test sample No. 8 in which the oxidation suppression layer was made of $ZrO_2$ solid solution containing $Y_2O_3$ in an amount of 8 mol % (hereinafter referred to as "YSZ" for short (also in Table 1)) and Test sample No. 9 devoid of the oxidation suppression layer were used.

TABLE 1

| Test sample No. | Conductive support substrate | | Oxidation suppression layer | | | | | Chamfering | Number of fuel cells sustaining crack in oxidation suppression layer after manufacture | Number of fuel cells sustaining crack after power generation |
|---|---|---|---|---|---|---|---|---|---|---|
| | Ni (% by volume) | $Y_2O_3$ (% by volume) | Major constituent | mol % | At end face of conductive support substrate | On solid electrolyte layer | On interconnector | | | |
| 1 | 45 | 55 | $Mg_2SiO_4$ | 95 | Present | — | — | — | 3/10 | 3/10 |
| 2 | 48 | 52 | $Mg_2SiO_4$ | 90 | Present | Present | Present | — | 2/10 | 2/10 |
| 3 | 48 | 52 | $Mg_2SiO_4$ | 85 | Present | Present | Present | — | 1/10 | 1/10 |
| 4 | 48 | 52 | $MgSiO_3$ | 90 | Present | Present | Present | — | 3/10 | 3/10 |
| 5 | 48 | 52 | $CaSiO_3$ | 90 | Present | Present | Present | — | 4/10 | 4/10 |
| 6 | 48 | 52 | $Mg_2SiO_4$ | 85 | Present | Present | Present | C face | 0/10 | 0/10 |
| 7 | 48 | 52 | $Mg_2SiO_4$ | 85 | Present | Present | Present | R face | 0/10 | 0/10 |
| 8 | 48 | 52 | YSZ | 100 | Present | Present | Present | — | 7/10 | 7/10 |
| 9 | 48 | 52 | — | — | — | — | — | — | 0/10 | 10/10 |

Asterisk (*) denotes departure from the scope of the invention

Next, the slurry for the intermediate layer was applied to the surface of the sintered compact of the first layer by means of screen printing, thereby forming a film of the second layer.

Subsequently, one end of the resulting compact of the fuel cell (one end of the non-power-generation portion) was immersed in a solution containing a major constituent as shown in Table 1, a glass component, and a solvent, thereby forming a compact of the oxidation suppression layer. The film of the second layer and the compact of the oxidation suppression layer was sintered for 3 hours at a temperature of 1300° C. The concentration of each major constituent contained in the solution was adjusted properly so that the oxidation suppression layer contained the major constituent in an amount as shown in Table 1 at the time of formation of the fuel cell. It is noted that, in forming Test sample No. 1, a slurry containing the major constituent shown in Table 1 was applied to the ends of the conductive support substrate 2 and the fuel electrode layer 3, followed by performing sintering.

Next, a liquid mixture was prepared from $La_{0.6}Sr_{0.4}Co_{0.2}Fe_{0.8}O_3$ powder having an average particle size of 2 μm and isopropyl alcohol. The liquid mixture was sprayed on the surface of the intermediate layer (the second layer) of the sintered stacked compact to form a compact of the air electrode layer. The compact was baked for 4 hours at a temperature of 1100° C., thereby forming the air electrode layer. In this way, fuel cells as shown in FIGS. 2, 5, and 6 were fabricated.

It is noted that, the fuel cell thereby fabricated has a dimension of 25 mm by 200 mm. The diameter of the fuel gas flow As will be understood from the results listed in Table 1, in Test sample No. 8 provided with the oxidation suppression layer containing YSZ as a major constituent, 70% or above of the fuel cells sustained development of a crack.

On the other hand, in each of Test sample No. 1 in which the oxidation suppression layer composed mainly of forsterite ($Mg_2SiO_4$) which was silicate containing Mg as at least one of the elements of Group 2 on the periodic table was provided on end faces of the conductive support substrate and the fuel electrode layer at one end of the fuel cell (non-power-generation portion) (the oxidation suppression layer was located at least on the conductive support substrate and the fuel electrode layer); Test Samples No. 2 and No. 3 in which the oxidation suppression layer composed mainly of forsterite was provided on the whole of one end of the fuel cell 1 (one end of the non-power-generation portion); Test sample No. 4 provided with the oxidation suppression layer composed mainly of steatite ($MgSiO_3$) which was silicate containing Mg as at least one of the elements of Group 2 on the periodic table; and Test sample No. 5 provided with the oxidation suppression layer composed mainly of wollastonite ($CaSiO_3$) which was silicate containing Ca as at least one of the elements of Group 2 on the periodic table, as compared with Test sample No. 8, the fuel cells sustaining a crack in the oxidation suppression layer were fewer in number. It will thus be seen that, by providing the oxidation suppression layer composed mainly of silicate containing at least one of the elements of Group 2 on the periodic table, it is possible to suppress development of a crack in the oxidation suppression layer during the manufacture of the fuel cell.

Moreover, in both of Test sample No. 6 in which an outer corner at one end of the fuel cell on the fuel-gas discharge side was chamfered to provide a C face after chamfering and Test sample No. 7 in which an outer corner at one end thereof on the fuel-gas discharge side was chamfered to provide an R face after round chamfering, no crack was developed in the oxidation suppression layer. It will thus be seen that chamfering makes it possible to suppress development of a crack in the oxidation suppression layer effectively during the manufacture of the fuel cell.

Next, the following tests of power generation were carried out on the fuel cells of Test samples No. 1 to No. 9 thus far described.

To begin with, ten fuel cells were formed for each Test sample on an individual basis. In each of the fuel cells, a hydrogen-containing gas (fuel gas) was fed into the gas flow channel to perform reduction treatment on the conductive support substrate and the fuel electrode layer. The reduction treatment was continued for 10 hours at a temperature of 850° C.

The ten fuel cells were then electrically connected in series with one another via power collecting members, and tests of power generation have been performed thereon for 3 hours in accordance with the following test procedure: passing a fuel gas into the fuel gas flow channel of the fuel cell; passing an oxygen-containing gas outside the fuel cell; and applying heat to 750° C. with use of an electric furnace. After that, under the condition where the rate of fuel utilization is 75%, a 1000-hour continuous power generation test was carried out in cycles, each of which is composed of: 10-minute power generation at a current density of 0.3 A/cm$^2$; a 1-minute pause in current passage after the power generation; 10-minute power generation at a current density of 0.1 A/cm$^2$; and a 1-minute pause in current passage after the power generation. During the power generation test, an excess of the fuel gas left unused after power generation was burned on the fuel-gas discharge side.

Following the completion of the tests, the fuel cells have been visually checked for signs of peeling at one end (the end of the non-power-generation portion) thereof, and have also been observed by a scanning electron microscope to check the presence of a crack or damage.

As will be understood from the results listed in Table 1, in Test sample No. 8 provided with the oxidation suppression layer containing YSZ as a major constituent, 70 percent of the fuel cells sustained development of a crack after power generation. Furthermore, in Test sample No. 9 devoid of the oxidation suppression layer, although no crack has been developed during the manufacture of the fuel cells, all of the fuel cells sustained development of a crack during power generation.

By way of contrast, in each of Test sample No. 1 in which the oxidation suppression layer composed mainly of forsterite ($Mg_2SiO_4$) which was silicate containing Mg as at least one of the elements of Group 2 on the periodic table is provided on the conductive support substrate and the fuel electrode layer at one end of the fuel cell (one end of the non-power-generation portion); Test Samples No. 2 and No. 3 in which the oxidation suppression layer composed mainly of forsterite was provided on the whole of one end of the fuel cell 1 (one end of the non-power-generation portion); Test sample No. 4 provided with the oxidation suppression layer composed mainly of steatite ($MgSiO_3$) which was silicate containing Mg as at least one of the elements of Group 2 on the periodic table; and Test sample No. 5 provided with the oxidation suppression layer composed mainly of wollastonite ($CaSiO_3$) which was silicate containing Ca as at least one of the elements of Group 2 on the periodic table, in contrast to the fuel cells of Test samples No. 8 and No. 9, development of a crack in the fuel cells could be suppressed. It will thus be seen that, by providing the oxidation suppression layer composed mainly of silicate containing at least one of the elements of Group 2 on the periodic table, it is possible to suppress oxidation of one end of the fuel cell and consequent damage during power generation of the fuel cell.

Moreover, in both of Test samples No. 6 and No. 7 in which outer corners at one ends of the fuel cell on the fuel-gas discharge side were chamfered and round-chamfered to provide a C face and an R face, respectively, neither of peeling, crack, nor damage occurred at one end. It will thus be seen that, in addition to providing the oxidation suppression layer composed mainly of silicate containing at least one of the elements of Group 2 on the periodic table, by performing chamfering or round-chamfering on the outer corner at one end of the fuel cell on the fuel-gas discharge side to provide a C face or R face, it is possible to suppress development of a crack in the fuel cell and in the oxidation suppression layer effectively during the manufacture of the fuel cell as well as power generation.

REFERENCE SIGNS LIST 1a, 1b, 1c, 1d: Fuel cell
2: Conductive support substrate
3: Fuel electrode layer
4: Solid electrolyte layer
5: Air electrode layer
6: Interconnector
7: Fuel gas flow channels
8: Intermediate layer
10: Oxidation suppression layer
11: Fuel cell module
20: Fuel cell device

The invention claimed is:

1. A fuel cell, comprising:
a columnar conductive support substrate comprises a fuel gas flow channel configured to be passing through therein for a flow of a fuel gas therethrough; and
a fuel electrode layer, a solid electrolyte layer, and an air electrode layer laminated in that order on the columnar conductive support substrate, wherein
one end of the fuel cell is configured to be a non-power-generation portion in which the fuel electrode layer and the solid electrolyte layer are laminated in that order on the conductive support substrate without the air electrode layer being laminated thereon, and
one end of the non-power-generation portion comprises an oxidation suppression layer composed mainly of silicate containing at least one of elements belonging to Group 2 on the periodic table, and the oxidation suppression layer is continuously formed on the conductive support substrate and the fuel electrode layer at an end face of the non-power-generation portion and on the conductive support substrate within the fuel gas flow channel in the non-power-generation portion.

2. The fuel cell according to claim 1, wherein an outer corner at the one end of the fuel cell is chamfered in an area ranging from an outermost surface of the fuel cell to the conductive support substrate, excluding the oxidation suppression layer.

3. The fuel cell according to claim 1, wherein the oxidation suppression layer is formed on the solid electrolyte layer in the non-power-generation portion and on a part of the interconnector facing to the non-power-generation portion.

4. A fuel cell device, comprising:
an exterior case;
a fuel cell module; and
an auxiliary device configured to operate the fuel cell module,
wherein the fuel cell module and the auxiliary device are located inside the exterior case,
the fuel cell module comprising:
a housing; and
a plurality of the fuel cells according to claim 2 located in the housing.

5. The fuel cell according to claim 1, wherein a content of the silicate containing at least one of the elements of Group 2 on the periodic table is equal to or greater than or 85 mol %.

6. The fuel cell according to claim 1, wherein one of forsterite ($Mg_2SiO_4$), steatite ($MgSiO_3$), and wollastonite ($CaSiO_3$) is used as the silicate containing at least one of the elements of Group 2 on the periodic table.

* * * * *